United States Patent [19]
Grund et al.

[11] Patent Number: 5,102,152
[45] Date of Patent: Apr. 7, 1992

[54] CHUCK

[75] Inventors: Gerhard Grund, Düsseldorf; Rainer Kempken, Erkrath, both of Fed. Rep. of Germany

[73] Assignee: Paul Forkardt GmbH & Co. KG, Düsseldorf, Fed. Rep. of Germany

[21] Appl. No.: 583,801

[22] Filed: Sep. 14, 1990

[30] Foreign Application Priority Data

Sep. 14, 1989 [DE] Fed. Rep. of Germany ....... 3930690

[51] Int. Cl.$^5$ .................................................. B23B 31/16
[52] U.S. Cl. .................................... 279/2.11; 279/121
[58] Field of Search ..................... 279/4, 121, 122, 74; 408/240

[56] References Cited

U.S. PATENT DOCUMENTS 3,926,446 12/1975 Rohm ............................. 279/121 X
3,945,654 3/1976 McMullen ..................... 279/1 L X

FOREIGN PATENT DOCUMENTS 1301689 11/1965 Fed. Rep. of Germany .
2903904 8/1980 Fed. Rep. of Germany .

Primary Examiner—Larry I. Schwartz
Assistant Examiner—Robert Schultz
Attorney, Agent, or Firm—Robert W. Becker & Associates

[57] ABSTRACT

A chuck for clamping workpieces or tools is provided. The chuck has a chuck body and at least two clamping jaws are radially displaceably guided in the chuck body and are operable, via wedge surfaces, by a driven chuck piston that is axially displaceable. The chuck piston is in the form of a closed, first annular piston having an outer surface that is guided all the way around in a bore of the chuck body, with a forward region of the outer piston surface being provided with tangentially extending wedge surface, the number of which corresponds to the number of clamping jaws, with these wedge surfaces cooperating with correspondingly shaped counter-surfaces of the clamping jaws. A second annular piston, which operates in an opposite direction, is disposed in the chuck body concentric to the first annular piston. The second annular piston is also provided with tangentially extending wedge surfaces that cooperate with corresponding counter-surfaces of the clamping jaws.

4 Claims, 3 Drawing Sheets

CHUCK

BACKGROUND OF THE INVENTION

The present invention relates to a chuck for clamping workpieces or tools, and includes a chuck body and at least two clamping jaws that are radially displaceably guided in the chuck body and are operable, via wedge surfaces, by a driven chuck piston that is axially displaceable.

A number of such chucks are known; see, for example, DE-PS 29 03 904, and DE-AS 1 301 689. The wedge surfaces needed for driving the chuck via the chuck piston are generally embodied as so-called key hooks that are provided on the radially inner end of the clamping jaws and engage in corresponding keyways of the chuck piston, which is axially displaceable in a central bore of the chuck body. Although such chucks give satisfactory results, they are subjected to deformations due to the influence of centrifugal force if the chuck is operated at very high speeds.

It is therefore an object of the present invention to provide a chuck of the aforementioned general type that while having a compact construction also has a very inherent stability and stiff construction in order not to be sensitive to the influence of centrifugal force that occurs at high speeds. Furthermore, while keeping the overall axial length as short as possible, it should be possible to provide the chuck with very small outer diameters and yet provide a large central bore, especially for the introduction of workpieces or tools.

BRIEF DESCRIPTION OF THE DRAWINGS

These and other objects and advantages of the present invention will appear more clearly from the owing specification in conjunction with the accompanying schematic drawings, in which.

SUMMARY OF THE INVENTION

Figure 1:
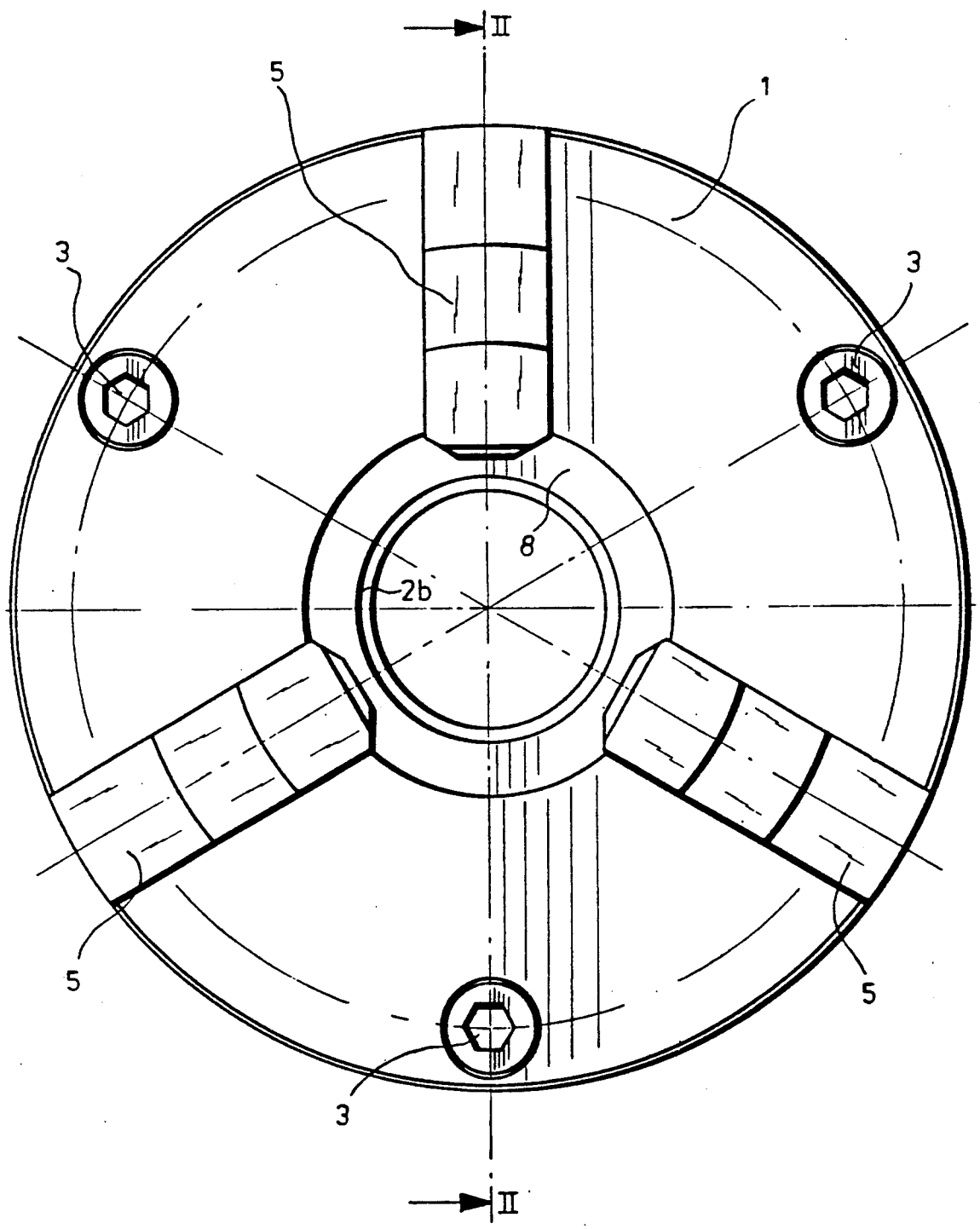
FIG. 1 is an end view of a three-jaw chuck.

The chuck of the present invention is characterized primarily in that the chuck piston is in the form of a closed, first annular piston having an outer surface that is guided all the way around in a bore of the chuck body, with a forward region of the outer piston surface, facing the clamping jaws, being provided with tangentially extending wedge surfaces, the number of which corresponds to the number of clamping jaws, with these wedge surfaces cooperating with correspondingly shaped counter-surfaces of the clamping jaws.

Since the chuck piston that serves for driving the clamping jaws is embodied as a closed annular piston and has an outer surface that is guided all the way around in the chuck body, which in this region is similarly embodied as a closed ring, a very rigid drive mechanism of the clamping jaws results that for all practical purposes is not influenced by centrifugal forces, so that in conjunction with the resulting direct support of the counter-surfaces of the clamping jaws on the annular chuck body via the annular piston, a very stiff construction is achieved that is not sensitive to the influence of centrifugal forces, so that the inventive chuck can be operated at very high speeds. As a consequence of the inventive configuration of the clamping jaw drive mechanism, the chuck can also have very small outer diameters Yet can be provided with a relatively large central bore for workpieces since the central portion of the chuck body no longer has to be kept free for a chuck piston.

Pursuant to a further specific embodiment of the present invention, the counter-surfaces that cooperate with the wedge surfaces of the annular piston are provided on the back side of the clamping jaws. This results in a particularly compact construction that can be subjected to high forces.

In order to be able to reset the clamping jaws, which are movable in radially outwardly or radially inwardly clamping directions, the clamping jaws can pursuant to the present invention, be acted upon by a return force that is opposite to the shifting movement effected by the annular piston. This return force is preferably effected by suitable springs or by a lever mechanism.

In order to provide a chuck that has a particularly short overall axial length yet is suitable for both external and internal clamping it is proposed pursuant to a further specific embodiment of the present invention that a second annular piston that is operated in the opposite direction be disposed in the chuck body in such a way as to be concentric to the first annular piston; this second annular piston is similarly provided with tangentially extending wedge surfaces for corresponding counter-surfaces of the clamping jaws. The two annular pistons which are operated in opposite directions, can selectively be used for an external or internal clamping, whereby in each case the other annular piston effects the resetting of the clamping jaws.

Pursuant to one preferred specific embodiment of the present invention, the two annular pistons are operated in opposite directions by means of a pressure medium, for which purpose the chuck body is provided with appropriate pressure chambers and connecting passages.

Further specific features of the present invention will be described in detail subsequently.

DESCRIPTION OF PREFERRED EMBODIMENTS

Referring now to the drawings in detail, the illustrated chuck which is embodied as a triple-jaw chuck, is provided with an annular chuck body 1, the back side of which is closed off by a cover means 2. The chuck body 1 is secured to the front flange 4a of a spindle 4 (indicated by dot-dash lines) via screws 3. The cover means 2 is secured to the chuck body 1 in a fluid-tight manner via screws 2a.

In the illustrated embodiment, three clamping jaws 5, which are shown as one-piece jaws, but could also be embodied as multi-part jaws are guided in a known manner in the chuck body 1 in such a way that they are movable in a radial direction. The chuck body 1 is furthermore provided with an annular recess 1a in which an annular piston 6 is disposed in such a way that it is movable in an axial direction. Shifting of this annular piston 6 is effected with the aid of a pressure medium, preferably a hydraulic fluid, which is selectively conveyed to the recess 1a via either the connecting passage 7a or the connecting passage 7b. Thus, the pressure medium selectively reaches one of the two annular end faces of the annular piston 6, which is sealed relative to the chuck body 1 via appropriate sealing rings.

The annular piston 6, which is embodied as a closed ring, has an outer surface that is supported all the way around in the chuck body recess 1a, which is produced by a bore. The forward region of the annular piston 6 is provided with tangentially extending wedge surfaces 6a, the number of which corresponds to the number of clamping jaws 5; these wedge surfaces 6a cooperate with correspondingly shaped counter-surfaces 5a of the respective clamping jaws 5. Consequently an axial movement of the annular piston 6 results in a radial shifting of the clamping jaws 5, which are guided in the chuck body 1 in such a way that they can be shifted only radially.

Disposed in a further recess 1b of the chuck body 1 is a second annular piston 8 that is concentric to the annular piston 6 and can also be shifted axially. The annular piston faces of the piston 8 can again be acted upon by pressure medium, this time via the connecting passages 9a and 9b. By means of sealing rings, this annular piston 8 is also sealed relative to the chuck body 1, and is furthermore sealed relative to an annular collar 2b of the cover means 2. As was the case with the annular piston 6, the annular piston 8 is provided with several tangentially extending wedge surfaces 8a, the number of which corresponds to the number of clamping jaws 5; these wedge surfaces 8a cooperate with correspondingly shaped counter-surfaces 5b of the clamping jaws 5. Due to the concentric arrangement of the two annular pistons 6 and 8 within the chuck body 1, a very short overall axial length of the entire chuck results, despite the fact that this chuck can be used for both external and internal clamping.

Figure 2:
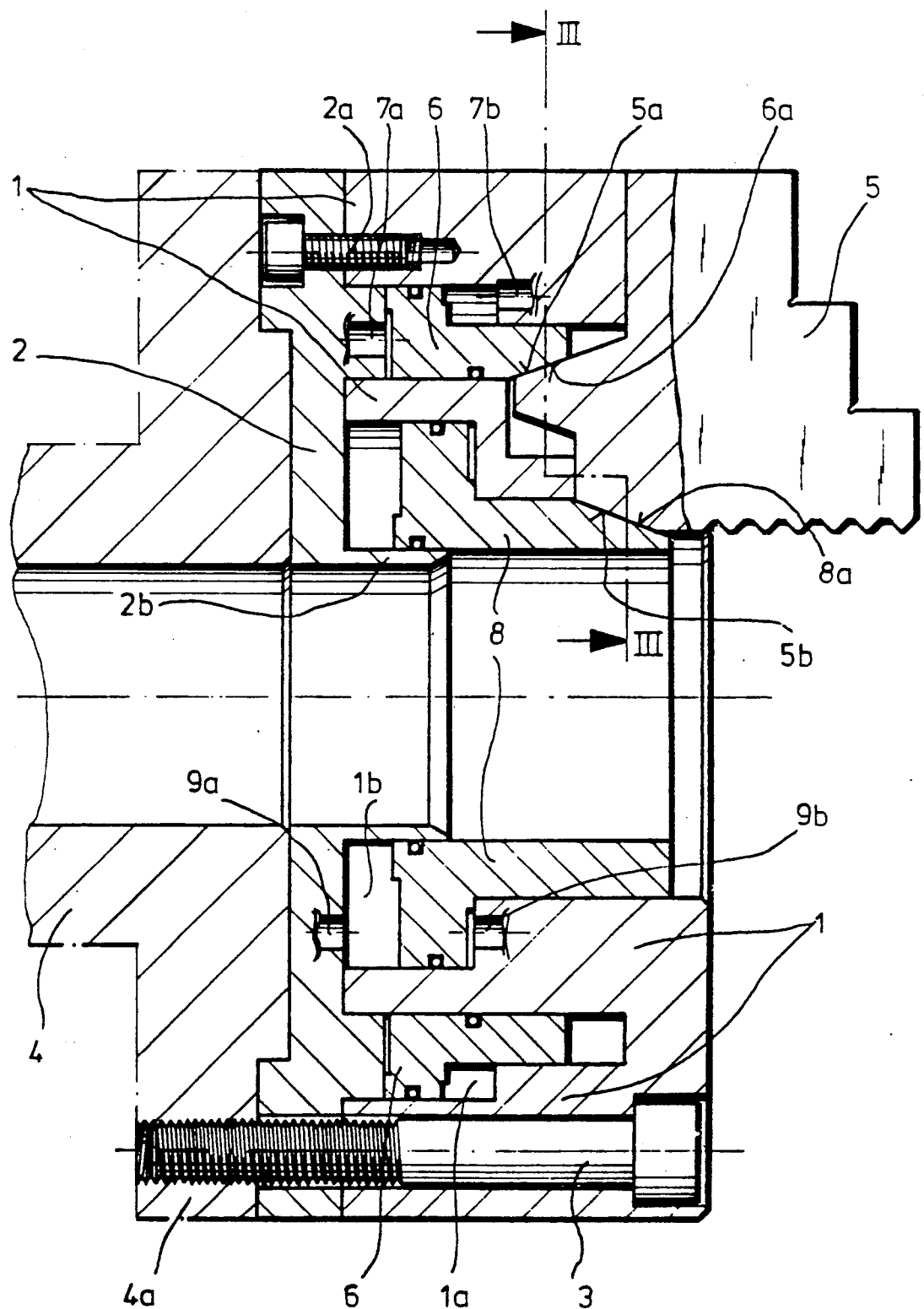
FIG. 2 is a longitudinal cross-sectional view taken along the line II—II in FIG. 1.
Figure 3:
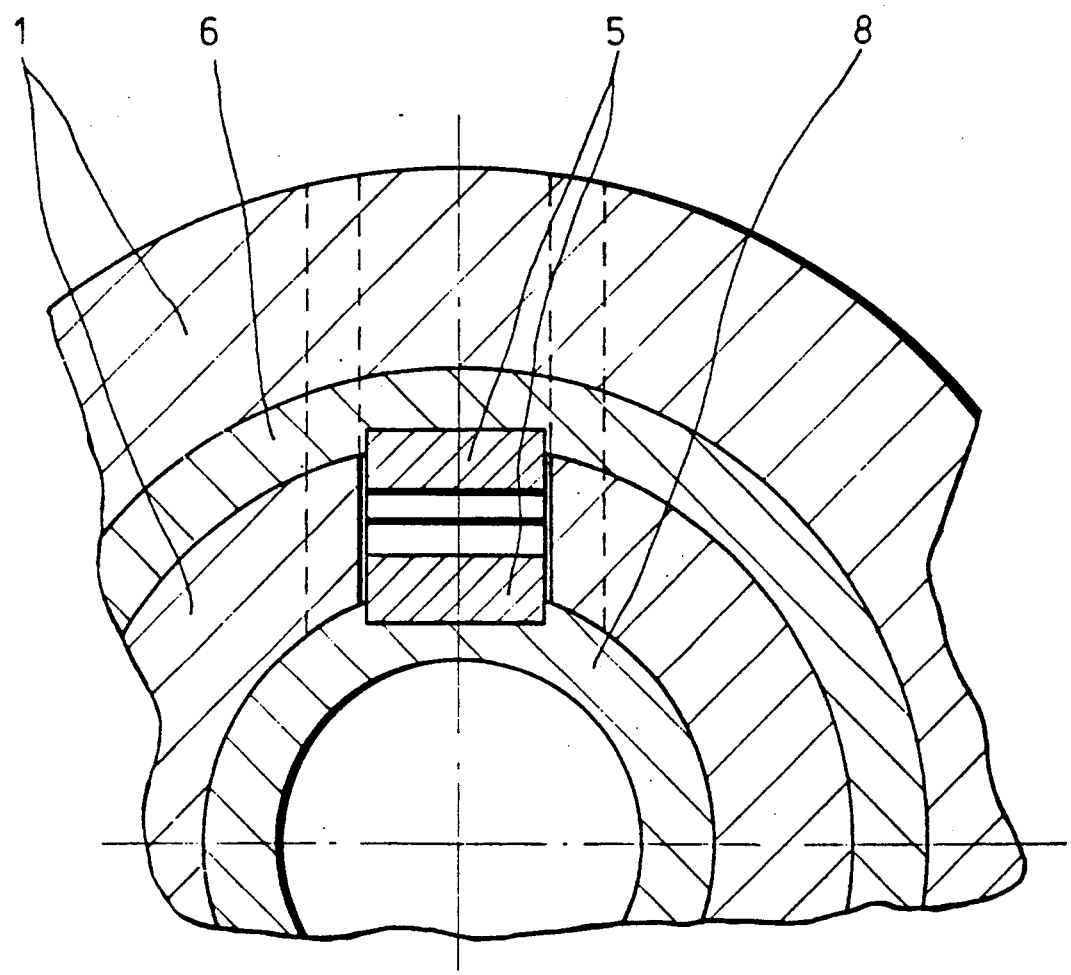
FIG. 3 is a partial cross-sectional view taken along the line III—III in FIG. 2.

If, for example, a workpiece is to be clamped between the three clamping jaws 5 of the illustrated chuck, pressure medium is supplied via the connecting passage 7a to that annular face of the piston 6 that is disposed on the left side in FIG. 2. In this situation, no pressure medium is supplied to either the connecting passage 7b or the connecting passage 9a of the annular piston 8. BY supplying pressure medium to the left piston face, the annular piston 6 is shifted toward the right. In so doing, the wedge surfaces 6a thereof, in cooperation with the cooperating counter-surfaces 5a of the clamping jaws 5, effect a shifting of these clamping jaws radially inwardly. By simultaneously supplying pressure medium to the inner annular piston B via the connecting passage 9b, the piston 8 is shifted toward the left.

To release the workpiece, or to carry out an internal clamping, in contrast to the procedure described above, pressure medium is supplied via the connecting passage 9a to that annular face of the piston 8 that is on the left side in FIG. 2; no pressure medium is supplied via the connecting passages 9b and 7a. In this situation, the annular piston 8 presses the clamping jaws 5 radially outwardly, while at the same time, by supplying pressure medium via the connecting passage 7b, a withdrawal movement of the annular piston 6 toward the left (FIG. 2) is effected. Thus, the two annular pistons 6 and 8 always operate in opposite directions and can therefore be used for the necessary reversal of the clamping jaws 5 regardless of the clamping movement that was carried out previously The present invention is, of course, in no way restricted to the specific disclosure of the specification and drawings, but also encompasses any modifications within the scope of the appended claims.

We claim:

1. In a chuck for clamping workpieces or tools, and including a chuck body and at least two clamping jaws that are radially displaceably guided in said chuck body and are operable, via wedge surfaces, by a driven chuck piston that is axially displaceable, the improvement wherein:

said chuck piston is in the form of a closed, first annular piston having an outer surface that is guided all the way around in a bore of said chuck body, with a forward region of said outer piston surface, facing said clamping jaws, being provided with tangentially extending wedge surfaces, the number of which correspond to the number of clamping jaws, with said wedge surfaces cooperating with correspondingly shaped counter-surfaces of said clamping jaws; and a second annular piston is disposed in said chuck body concentric to said first annular piston and is driven in a direction opposite to that of said first annular piston, with said second annular piston being provided with second tangentially extending wedge surfaces that cooperate with corresponding second counter-surfaces of said clamping jaws.

2. A chuck according to claim 1, in which said counter-surfaces of said clamping jaws are provided on a back side thereof, facing said chuck body.

3. A chuck according to claim 1, which includes means for exerting upon said clamping jaws a return force that acts in a direction opposite to a displacement movement effected by said first annular piston.

4. A chuck according to claim 1, in which said chuck body is provided with pressure chambers and connecting passages for pressure medium for effecting said driving of said first and second annular pistons in opposite directions relative to one another.

* * * * *